United States Patent Office 3,658,868
Patented Apr. 25, 1972

3,658,868
ALKYLSILOXY-CYANO-ALKYL COMPOUNDS AND PROCESS FOR PREPARING THE SAME
Richard Müller, Radebeul, and Hiltraud Neef, Dresden, Germany, assignors to Institut fur Silikon- und Fluorkarbon-Chemie, Radebeul, Germany
No Drawing. Filed Apr. 15, 1969, Ser. No. 816,370
Int. Cl. C07f 7/04, 7/18
U.S. Cl. 260—448.8 R            21 Claims

ABSTRACT OF THE DISCLOSURE

Alkylsiloxy-cyano-alkyl compounds of the formula

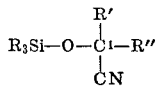

wherein R is a lower alkyl radical and R' and R", which may be the same or different, are hydrogen, or unsubstituted or substituted, alkyl, alkenyl, aryl, alkoaryl or cycloalkyl radicals including siloxy-, carboxy- or siloxy-cyano-substituted radicals, whereby the $C^1$-carbon atom can also be part of an aliphatic ring system. The invention also comprises a process for making said compounds. The so produced alkylsiloxy-cyanoalkanes are very useful aids in textile processing and are preferably used for rendering the textiles water-repellent.

---

The present invention relates to novel alkylsiloxy-cyanoalkanes, -cyanoalkanones, -cyanoalkanales, and bis-organosiloxy-bis-cyano-alkyl compounds, and a process for making the same.

Alkylsiloxy-cyanoalkanes are used advantageously in the textile processing industries, particularly in hydrophobing. The greatest advantage of their application is based on their property of being split, with comparative ease, into a reactive alkylsilicon compound and an organic cleavage product which, contrary to other conventional agents, does not adversely affect the hydrophobing of the textile.

A known process for the preparation of organosiloxy-cyanoalkanes, particularly of methyl- and phenylsiloxy-cyanopropane-cyanopropoxysilanes, consists in reacting organochlorosilanes with acetonecyanohydrin (K. C. Frisch and M. Wolf, J. Org. Chem. 18 (1953) p. 657; U.S. Pat. 2,657,226).

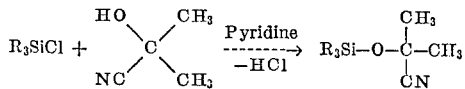

The above-mentioned process has the following disadvantages:

(1) The formation of HCl as a by-product which has to be neutralized by pyridine. The thus produced pyridinium hydrochloride has to be filtered off and washed in a costly operation.

(2) The reaction requires special cooling to temperatures below 5° C.

(3) The reaction is carried out in a solvent, e.g. benzene.

(4) The reaction products are therefore impure, due to the presence of solvent, pyridine, and pyridine hydrochloride.

(5) The process is practically limited to acetone cyanohydrin as starting material since the derivatives of the same, for instance aryl compounds, are so instable, often even explosive, that they are not applicable in carrying out the process according to U.S. Pat. 2,657,226.

It is therefore an object of the present invention to overcome the drawback of the known process for preparing alkylsiloxy-cyano-alkyl compounds and to provide a process of wide applicability to the preparation of said compounds with a variety of substituents.

It is a further object to provide novel alkylsiloxy-cyano-alkyl compounds particularly for the processing of textiles.

Other objects and advantages of the present invention will become apparent from the detailed description hereinbelow.

According to the present invention it is possible to prepare by simple operations alkylsiloxy-cyano-alkyl compounds directly in pure state; the process of the invention permits to prepare also alkylsiloxy-cyanoalkanes, -cyanoalkanones, -cyanoalkanales and bis-alkylsiloxy-bis-cyanoalkanes which are up to now not accessible by other methods.

The compounds of the invention are represented by the formula

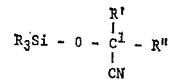

wherein R is a lower alkyl radical and R' and R", which may be the same or different, are hydrogen, or unsubstituted or substituted, alkyl, alkenyl, aryl, alkoaryl or cycloalkyl radicals including siloxy-, carboxy- or siloxy-cyano-substituted radicals, whereby the $C^1$-carbon atom can also be part of an aliphatic ring system.

For preparing the compounds of the invention alkyl-cyano-silanes are added to aldehydes or ketones as follows:

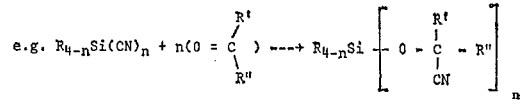

wherein R, R', R" have the same meanings as above explained, and $n$ is 1 or 2.

The reaction is capable of many variations. Thus dialdehydes and di-ketones can be converted into bis-trialkylsiloxy-bis-cyanoalkanes by reaction with e.g. trialkylcyanosilanes. The preparation of similar alkanones and alkanales can be effected in analogous manner. On the other hand it is possible to obtain for instance from dialkyldicyanosilanes with ketones or aldehydes as shown:

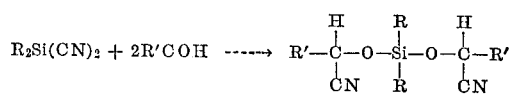

In the reactions underlying the present invention it is best to add directly, drop by drop, the alkylcyanosilane to the carbonyl compound, without the use of an inert solvent, preferably while stirring at room temperature with exclusion of atmospheric moisture. However, the reaction may also be carried out in a solvent, e.g. benzene, xylene and the like and at other temperatures. Subsequently, the reaction mixture is heated for the completion of the reaction for two hours in an oil bath either at normal or increased pressure, and depending on the reaction partners to temperatures which, in general, range from 20° C. to 180° C.; after-treatment may consist in stirring at the elevated temperature for 5 to 20, preferably for 10 hours; then the alkylsiloxy-cyano-alkyl compound obtained is distilled off, or if it is a solid product, filtered and re-crystallized.

The process according to the invention has the following advantages:

(1) It may be carried out without a solvent.

(2) No by-products are formed. The desired compounds are obtained directly in substantially pure state and high yields.

(3) The reaction is capable of great variation and permits to obtain a large number of different alkylsiloxy-cyano-alkyl compounds.

The alkylcyanosilanes used as starting materials may be easily prepared from the corresponding chlorosilanes by means of salt melts (see W. Sundermeyer, Z. anorg. allg. Chem. 313 (1962) p. 290) or by reaction with complex cyanides (T. A. Bither et al., J. Amer. Chem. Soc. 80 (1958) p. 4151) or from iodosilanes with AgCN (C. Haborn, J. Chem. Soc. (1949) p. 2755).

In the following, the invention will be more fully described with reference to a number of examples, but it should be understood that these are given by way of illustration and not of limitation, and that many modifications may be made without departing from the spirit of the invention. All percentages are by weight percent.

EXAMPLE 1

1-trimethylsiloxy-1-cyanopropane 0.21 mol trimethylcyanosilane are added drop by drop to 0.2 mol propionaldehyde at room temperature while stirring. The mixture is heated in the course of 2 hours up to 80° C. in an oil bath and then stirred at that temperature for eight hours. Subsequently, distillation takes place. Yield 95%. Boiling point 168 to 170° C. $n_D^{20}$: 1.4072, $d_4^{20}$: 0.8714.

Analysis.—Calcd. (percent): C, 53.45; H, 9.61; Si, 17.86%; M.W. 157.29. Found (percent): C, 53.4; H, 9.3; Si, 18.1; M.W. 152.

(M.W.=molecular weight.)

EXAMPLE 2

1-triethylsiloxy-1-cyanopropane 0.2 mol propionaldehyde, 0.21 mol triethylcyanosilane. Oil bath temperature 140° C., other reaction conditions as in Example 1. Yield 93%. B.P. 228 to 230° C. $n_D^{20}$: 1.4308, $d_4^{20}$: 0.8843.

Analysis.—Calcd. (percent): C, 59.94; H, 11.06; Si, 14.02; M.W. 200.37. Found (percent): C, 60.2; H, 11; Si, 14.4; M.W. 190.

EXAMPLE 3

2-trimethylsiloxy-2-cyanobutane 0.15 mol ethylmethylketone, 0.16 mol trimethylcyanosilane. Oil bath temperature 160° C., other reaction conditions as in Example 1. Yield 85%. B.P. 165 to 166° C. $n_D^{20}$: 1.41, $d_4^{20}$: 0.8629.

Analysis.—Calcd. (percent): C, 56.09; H, 10; Si, 16.39; M.W. 171.32. Found (percent): C, 56.1; H, 10.7; Si, 16.3; M.W. 173.

EXAMPLE 4

1-trimethylsiloxy-1-cyanocyclopentene 0.15 mol cyclopentanone, 0.16 mol trimethylcyanosilane. Oil bath temperature 160° C., other reaction conditions as in Example 1. Yield 65%. B.P. 197 to 198° C. $n_D^{20}$: 1,434, $n_4^{20}$: 0.913.

Analysis.—Calcd. (percent): C, 58.96; H, 9.35; Si, 15.32; M.W. 183.33. Found (percent): C, 60.4; H, 9.6; Si, 15.1; M.W. 185.

EXAMPLE 5

1-trimethylsiloxy-1-cyanocyclohexane 0.1 mol cyclohexanone, 0.1 mol trimethylcyanosilone. Oil bath temperature 180° C., other reaction conditions as in Example 1. Yield 93%. B.P. 210 to 212° C. $n_D^{20}$: 1.4443, $d_4^{20}$: 0.9276.

Analysis.—Calcd. (percent): C, 60.86; H, 9.7; Si, 14.23; M.W. 197.35. Found (percent): C, 60.86; H, 10; Si, 14.4; M.W. 200.

EXAMPLE 6

1-trimethylsiloxy-1-cyanophenylmethane 0.2 mol benzaldehyde, 0.21 mol trimethylcyanosilane. Oil bath temperaure 135° C., other reaction conditions as in Example 1. In order to prevent autoxidation of benzaldehyde the reaction is carried out under $N_2$ or another inert gas. Yield 90%. B.P. 253 to 254° C. $n_D^{20}$: 1.4827, $d_4^{20}$: 0.9834.

Analysis.—Calcd. (percent): C, 64.35; H, 7.35; Si, 13.68; M.W. 205.33. Found (percent): C, 64.2; H, 7.4; Si, 14.2; M.W. 200.

EXAMPLE 7

1-trimethylsiloxy-1-cyano-1-phenylethane 0.2 mol acetophenone, 0.21 mol trimethylcyanosilane. Oil bath temperature 140° C., other reaction conditions as in Example 1. Yield 70%. B.P. 237 to 238° C. $n_D^{20}$: 1.4804, $d_4^{20}$: 0.9659.

Analysis.—Calcd. (percent): C, 65.7; H, 7.81; Si, 12.8; M.W. 219.36. Found (percent): C, 65.9; H, 7.8; Si, 12.7; M.W. 210.

EXAMPLE 8

2,4-bis-trimethylsiloxy-2,4-bis-cyano-3,3-dimethylpentane 0.2 mol 3,3-dimethylacetylacetone, 0.42 mol trimethylcyanosilane. Oil bath temperature 130° C., other reaction conditions as in Example 1. Yield 72%. B.P. 115° C./15 mm. $n_D^{20}$: 1.437.

Analysis.—Calcd. (percent): C, 55.17; H, 9.26; Si, 17.2. Found (percent): C, 55.7; H, 9.2; Si, 17.1.

EXAMPLE 9

Trimethylsiloxy-cyano-(2-carboxyphenyl)-methane 0.2 mol o-phthalic di-aldehyde, 0.25 mol trimethylcyanosilane. Oil bath temperature 140° C., other reaction conditions as in Example 1. Yield 72%. B.P. 112° C./0.9 mm. $n_D^{20}$: 1.495.

Analysis.—Calcd. (percent): C, 61.77; H, 6.48; Si, 12.04; N, 6; M.W. 233.34; Found (percent): C, 61.5; H, 6.4; Si, 12.2; N, 6.1; M.W. 221.

EXAMPLE 10

$\omega,\omega'$-bis-trimethylsiloxy-$\omega,\omega'$-bis-cyanoxylene (1,2)

0.2 mol o-phthalic di-aldehyde, 0.8 mol trimethylcyanosilane. Oil bath temperature 150° C., other reaction conditions as in Example 1. Yield 60%. B.P. 146° C./1 mm. $n_D^{20}$: 1.4827.

Analysis.—Calcd. (percent): C, 57.79; H, 7.27; Si, 16.89; M.W. 332.55. Found (percent): C, 58.8; H, 7.5; Si, 16.7; M.W. 319.

EXAMPLE 11

2,4-bis-trimethylsiloxy-4-cyanopentene (2)

0.2 mol acetylacetone, 0.45 mol trimethylcyanosilane. Oil bath temperature 90° C., other reaction conditions as in Example 1. Yield 75%. B.P. 62° C./0.2 mm. $n_D^{20}$: 1.432, $d_4^{20}$: 0.9391.

Analysis.—Calcd. (percent): C, 53.08; H, 9.28; Si, 20.67. Found (percent): C, 53.5; H, 9.1; Si, 19.9.

EXAMPLE 12

(a) 5-trimethylsiloxy-5-cyanohexanone (2)
(b) 2,5-bis-trimethylsiloxy-2,5-bis-cyanohexane 0.25 mol acetonylacetone, 0.8 mol trimethylcyanosilane. Oil bath temperature 130° C., other reaction conditions as in Example 1. Obtained are the two products (a) and (b) as specified above.

(a) Yield 35%. B.P. 95° C./0.6 mm. $n_D^{20}$: 1.4337.

*Analysis.*—Calcd. (percent): C, 56.3; H, 8.98; Si, 13.17; M.W. 213.35. Found (percent): C, 58; H, 9.1; Si, 12.1; M.W. 195.

(b) Yield 20%. Melting point 92 to 94° C., recrystallized from diethyl ether.

*Analysis.*—Calcd. (percent): C, 53.8; H, 9.03; Si, 17.97; M.W. 312.56. Found (percent): C, 53.8; H, 9.2; Si, 18; M.W. 306.

EXAMPLE 13

1,2-bis-trimethylsiloxy-1,2-bis-cyano-1,2-diphenylethane 0.2 mol benzil, 0.42 mol trimethylcyanosilane. Oil bath temperature 145° C., other reaction conditions as in Example 1. Yield 95%. M.P. 186 to 187° C., recrystallized from alcohol.

*Analysis.*—Calcd. (percent): C, 64.66; H, 6.91; Si, 13.75; N, 6.86; M.W. 408.65. Found (percent): C, 64.8; H, 7.1; Si, 13.5; N, 6.9; M.W. 411.

EXAMPLE 14

(a) 2-trimethylsiloxy-2-cyanobutanone
(b) 2,3-bis-trimethylsiloxy-2,3-bis-cyanobutane 0.14 mol di-acetyl, 0.3 mol trimethylcyanosilane. Oil bath temperature 120° C., other reaction conditions as in Example 1. Obtained are the two products (a) and (b) as specified above.

(a) Yield 12%. B.P. 200 to 203° C. $n_D^{20}$: 1.421.

*Analysis.*—Calcd. (percent): C, 51.85; H, 8.16; Si, 15.16; N, 7.56; M.W. 185.3. Found (percent): C, 53.1; H, 9; Si, 14.7; N, 7.4; M.W. 180.

(b) Yield 70%. B.P. 256 to 257° C. M.P. 71 to 72° C., recrystallized from ethyl alcohol.

*Analysis.*—Calcd. (percent): C, 50.66; H, 8.5; Si, 19.74; N, 9.85; M.W. 284.51. Found (percent): C, 50.1; H, 8.4; Si, 19; N, 9.8; M.W. 284.

EXAMPLE 15

2,3-bis-tri-n-propylsiloxy-2,3-bis-cyanobutane 0.05 mol di-acetyl, 0.1 mol tri-n-propylcyanosilane. Oil bath temperature 210° C., other reaction conditions as in Example 1. Yield 53%. B.P. 186 to 192° C./3 mm. (with decomposition. M.P. 44 to 45° C.), recrystallized from ethyl alcohol.

*Analysis.*—Calcd. (percent): C, 63.66; H, 10.68; Si, 12.41; N, 6.18; M.W. 452.83. Found (percent): C, 64.5; H, 11.2; Si, 12.2; N, 6.3; M.W. 440.

EXAMPLE 16

Bis-(2-cyanopropoxy)-dimethylsilane 0.2 mol dimethyl-di-cyanosilane are dissolved in 100 ml. of dry benzene and added dropwise, while stirring, to 0.5 mol acetone at room temperature with exclusion of moisture. Subsequently, the reaction mixture is heated to a temperature of 85° C. in an oil bath and stirred for twelve hours at that temperature. Distillation in vacuo follows. Yield 60%. B.P. 120° C./15 mm. $n_D^{20}$: 1.4185.

*Analysis.*—Calcd. (percent): C, 53.42; H, 8.51; Si, 12.20. Found (percent): C, 53.1; H, 8; Si, 12.41.

What we claim is:
1. The compound 1-trimethylsiloxy-1-cyanopropane.
2. The compound 1-triethylsiloxy-1-cyanopropane.
3. The compound 1-trimethylsiloxy - 1 - cyanocyclopentane.
4. The compound 1-trimethylsiloxy - 1 - cyanocyclohexane.
5. The compound 1-trimethylsiloxy - 1 - cyanophenylmethane.
6. The compound 1-trimethylsiloxy-1-cyano-1-phenylethane.
7. The compound 2,4-bis-trimethylsiloxy - 2,4 - bis-cyano-3,3-dimethyl-pentane.
8. The compound trimethylsiloxy-cyano - (2 - carboxyphenyl)-methane.
9. The compound ω,ω'-bis-trimethylsiloxy - ω,ω' - bis-cyanoxylene(1,2).
10. The compound 2,4-bis-trimethylsiloxy - 4 - cyano-pentene(2).
11. The compound 5-trimethylsiloxy - 5 - cyano hexanone(2).
12. The compound 2,5-bis-trimethylsiloxy - 2,5 - bis-cyanohexane.
13. The compound 1,2-bis-trimethylsiloxy - 1,2 - bis-cyano-1,2-diphenylethane.
14. The compound 2-trimethylsiloxy-2-cyanobutanone.
15. The compound 2,3-bis-trimethylsiloxy - 2,3 - bis-cyanobutane.
16. The compound 2,3 - bis-tri-n-propylsiloxy-2,3-bis-cyanobutane.
17. A process for preparing alkylsiloxy-cyano-alkyl compounds of the general formula

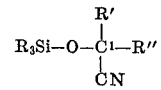

wherein R is a lower alkyl radical and R' and R'' are hydrogen, or unsubstituted or substituted, alkyl, alkenyl, aryl, alkoaryl or cycloalkyl radicals which also may be substituted by tri-lower alkyl-siloxy-, carbonyl or tri-lower alkyl-siloxy-cyano-alkyl groups, whereby the C¹ carbon atom can also be part of an aliphatic ring system, which process comprises reacting $R_{4-n}Si(CN)_n$, wherein R is a lower alkyl and $n$ represents 1 or 2, with aldehydes or ketones of the formula

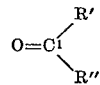

wherein R' and R'' have the meaning defined above.

18. The process as defined in claim 17, wherein the alkylcyanosilanes are reacted with di-aldehydes or di-ketones of the general formula

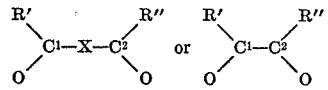

wherein R' and R'' have the meaning as defined in claim 19 and X is substituted or unsubstituted alkylene, alkenylene or arylene.

19. The process as defined in claim 18, wherein C¹ and C² are parts of an aliphatic ring system or are linked to the same aliphatic or aromatic system.

20. The process as defined in claim 17, wherein the reaction is carried out in an inert solvent.

21. The process as defined in claim 17, wherein the reaction is carried out in the atmosphere of an inert gas.

References Cited

UNITED STATES PATENTS 2,657,226   10/1953   Frisch et al. _____ 260—448.8 R

TOBIAS E. LEVOW, Primary Examiner

P. F. SHAVER, Assistant Examiner

U.S. Cl. X.R.

117—135.5; 252—8.6